Nov. 26, 1935.　　　　J. E. BOWER　　　　2,022,336
SELF CLEANING SCREEN
Filed Jan. 30, 1935
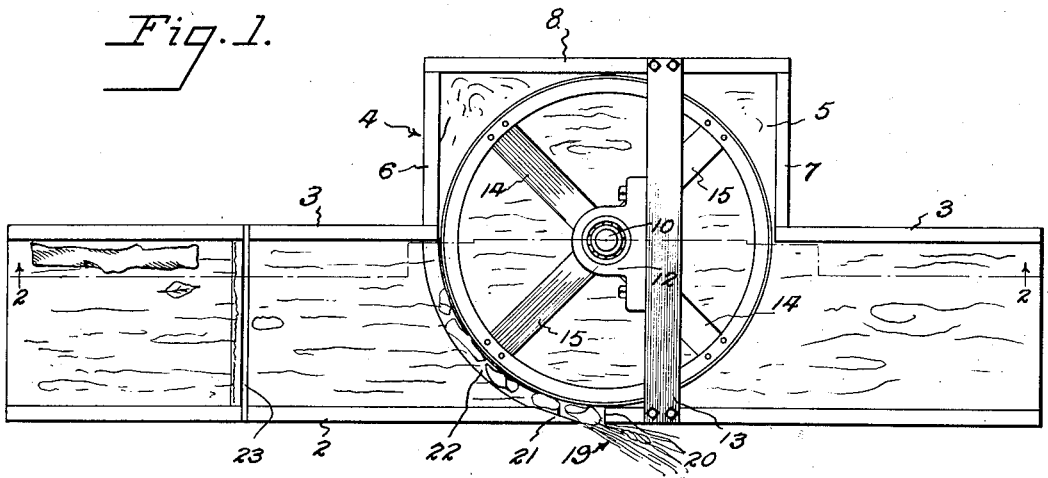
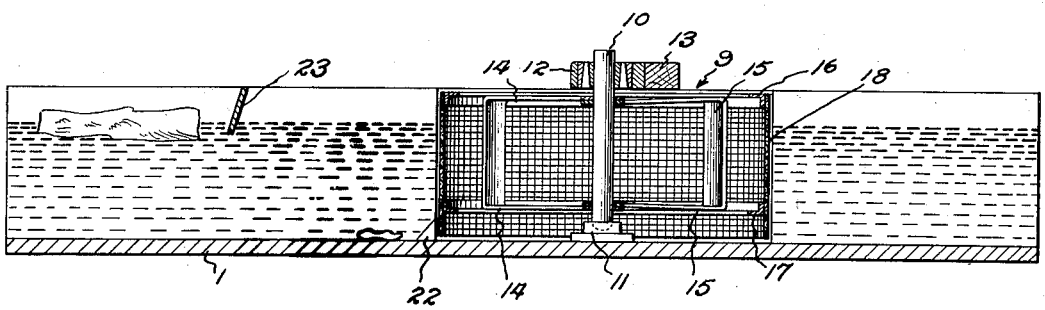
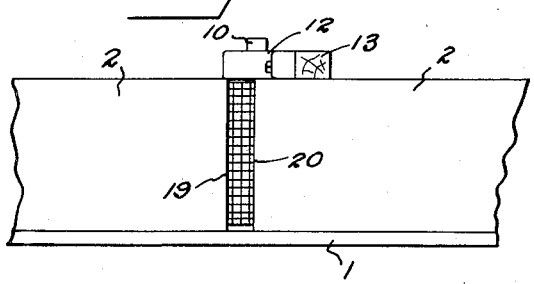
Inventor
J. E. Bower Patented Nov. 26, 1935

2,022,336

UNITED STATES PATENT OFFICE 2,022,336

SELF CLEANING SCREEN

Joseph E. Bower, Lincoln, Mont.

Application January 30, 1935, Serial No. 4,179

4 Claims. (Cl. 210—173)

This invention relates to self cleaning screens for sluice-ways, irrigation ditches and the like, wherein it is desirable to have the water supply screened to remove leaves, twigs and the like therefrom, and to serve as a fish stop to prevent fish from getting into irrigation ditches.

The main object of the invention is to provide a device of the character referred to which operates automatically to screen the water fed therethrough, and automatically to remove the trash and other debris from this water.

Another object of the invention is to provide a device of the character referred to which can be manufactured very cheaply and which comprises a minimum number of parts for effecting the cleansing function without unnecessarily complicated mechanism.

Other objects of the invention will be described as the detailed description thereof proceeds.

In the drawing:

Figure 1 is a top plan of the invention;

Figure 2 is a vertical transverse section taken on the line 2—2 of Figure 1; and Figure 3 is a fragmentary side elevation of the apparatus, adjacent a discharge outlet for the trash removed from the water stream.

As shown in the drawing, the invention comprises a flume having a bottom 1, side walls 2 and 3 suitably secured to said bottom 1; and a laterally offset screen box designated generally by the reference numeral 4. The screen box 4 comprises a bottom 5, forming a lateral extension of the flume bottom 1 and preferably lying in the same plane. Side walls 6 and 7 extend upwardly from the bottom 5 and are connected at their inner ends to the side wall 3 of the flume and at their outer ends to a rear side wall 8. The upper edges of the walls 6, 7 and 8 are substantially flush with the upper edges of the walls 2 and 3 of the flume.

The cleaning wheel designated generally by the reference numeral 9 includes a vertical shaft 10 having its lower end rotatably mounted in a step bearing 11 suitably secured to the bottom 1 of the flume. The upper end of the shaft 10 is journaled in a bearing 12 which is bolted or otherwise secured to a cross bar 13 having its opposite ends extending across and secured to the top edges of the walls 2 and 8.

The wheel 9 is constructed as light as possible consistent with its strength, in accordance with the conditions under which it is intended to be used. Preferably it is formed of two rectangular straps 14 and 15 of sheet metal, overlapping to form upper and lower spiders suitably secured to the vertical shaft 10.

The spiders formed by the rectangular straps 14 and 15 extend radially from the vertical shaft 10 and are secured at their outer ends to the upper and lower angular rings 16 and 17 which form the circular framework to which the cylindrical screen 18 is suitably secured. The distance between the sides 6 and 7 of the wheel box is just sufficient to permit rotation of said wheel 10 while preventing passage of trash into the box 4. The axis of rotation of the wheel lies in the plane of the inner face of the wall 3 on opposite sides of the box 4; and the radius of the wheel is substantially the same as the width of the flume between the inner faces of the sides 2 and 3.

The side 2 is provided with a vertical outlet 19 through which the trash and other débris is automatically discharged during the rotation of the cleaning wheel. One edge 20 of the outlet 19 lies in the plane passing through the axis of the shaft 10; and the other edge 21 of the outlet 19 is sloped to direct the débris through the aforesaid outlet.

In order to prevent heavy matter which floats or rolls on the bottom wall 1 of the flume from becoming wedged under the bottom of the wheel, a quarter-circle 22 of suitable material which is triangular in cross section, is secured to the bottom of the flume quite close to the lower part of the screen wheel 9. This member 22 forms an inclined plane which directs the heavy matter from the bottom of the flume away from the lower edge of the screen 9, to be discharged with the lighter material through the outlet 19.

A baffle plate 23 is secured between the sides 2 and 3 of the flume so as to trap logs or other heavy matter which might injure the screen wheel 9 if they were permitted to come in forcible contact therewith. The lower edge of the baffle plate 23 is intended to extend somewhat below the level of the water flowing therethrough in order to perform this function of trapping floating material which can be removed manually after any sizable accumulation thereof.

It will be apparent from the drawing that water flowing through the flume will operate only upon one-half of the screen wheel to effect rotation thereof. It has been found in actual practice that it is not necessary to provide this apparatus with paddles to cause rotation thereof. The trash collecting on the screen and the outlet 19 form in effect a paddle which adds to the force of the current for rotating the aforesaid wheel. The width of the bypass outlet 19 depends on the amount and size of the foreign matter to be removed from the water, and also upon the amount of the available waste water. The mesh of the screen which forms the cylindrical surface of the wheel will, of course, depend on the fineness of the material to be removed from the water flowing through the flume. It is obvious that this apparatus will provide an automatically operable device for removing all leaves, moss or other trash from water fed through a conduit before it enters a pipe line, turbine, pelton wheel, or other water conveyor or mechanical device using water. It is also adaptable for use as a fish screen to prevent fish from going down irrigation ditches.

What I claim is:

1. A conduit comprising a bottom, sides extending vertically therefrom, a wheel box extending laterally from one of said sides and having opposite walls thereof spaced apart a distance equal to twice the width of said conduit between the sides thereof and a cylindrical screen having a radius equal to said width and rotatable in said box and conduit about an axis coplanar with the inner face of said side, the other side of said conduit having an outlet slot adjacent the periphery of said screen.

2. A conduit comprising a bottom, sides extending vertically therefrom, a wheel box extending laterally from one of said sides and having the opposite walls thereof spaced apart a distance equal to twice the width of said conduit between the sides thereof and a cylindrical screen having a radius equal to said width and rotatable in said box and conduit about an axis coplanar with the inner face of said side, the other side of said conduit having an outlet slot adjacent the periphery of said screen, one edge of said slot lying in a plane passing through said axis and perpendicular to said side.

3. A conduit comprising a bottom, sides extending vertically therefrom, a wheel box extending laterally from one of said sides and having the opposite walls thereof spaced apart a distance equal to twice the width of said conduit between the sides thereof and a cylindrical screen having a radius equal to said width and rotatable in said box and conduit about an axis coplanar with the inner face of said side, the other side of said conduit having an outlet slot adjacent the periphery of said screen, one edge of said slot lying in a plane passing through said axis and perpendicular to said side, and the other edge of said slot being sloped to conduct débris through said slot tangentially with reference to said screen.

4. A conduit comprising a bottom, sides extending vertically therefrom, a wheel box extending laterally from one of said sides and having the opposite walls thereof spaced apart a distance equal to twice the width of said conduit between the sides thereof and a cylindrical screen having a radius equal to said width and rotatable in said box and conduit about an axis coplanar with the inner face of said side, the other side of said conduit having an outlet slot adjacent the periphery of said screen, one edge of said slot lying in a plane passing through said axis and perpendicular to said side, and an arcuate member fixed to said bottom between the sides of said conduit to conduct matter upwardly toward the periphery of said screen, said arcuate member having its center at the vertical axis of the cylindrical screen.

JOSEPH E. BOWER.